United States Patent Office 3,116,216
Patented Dec. 31, 1963

3,116,216
PRODUCTION OF CEPHALOSPORIN C BY FERMENTATION
Arnold L. Demain, Westfield, N.J., assignor to Merck & Co., Inc., Rahway, N.J., a corporation of New Jersey
No Drawing. Filed July 2, 1962, Ser. No. 207,037
6 Claims. (Cl. 195—36)

This invention relates to the formation of cephalosporin C antibiotics and, more particularly, it relates to the biosynthesis of cephalosporin C in a synthetic fermentation medium containing ε-N-acetyl-L-lysine (hereinafter referred to as "AL") and ε-amino-n-caproic acid (hereinafter referred to as "ACA") as stimulatory additives.

Cephalosporin C is a well-known antibiotic which is produced by fermentation of a suitable culture-containing medium. It has been desired for some time to provide a new and improved fermentation bath in which the production of cephalosporin C is at an optimum. While the chemical compound methionine has been used for this purpose with some degree of success in the past, it has still remained for the art to provide even more stimulatory additives.

What is described herein is an improved biosynthetic fermentation medium for the production of cephalosporin C in which there is present an additional constituent which, either alone or in combination with each other and/or methionine, enables the production of cephalosporin C in even greater yields than have hitherto been achieved. In accordance with the invention, these compounds are AL and ACA.

The microorganism used in the fermentation of the present invention has been deposited in the American Type Culture Collection and has been given the designation ATCC No. 11,550.

The fermentation is comed out by first growing a slant culture of the microorganism, then developing a vegetative inoculum from the slant culture and, finally, adding the inoculum to a suitable fermentation medium containing the stimulatory additives.

Suitable culture slants of the microorganism may be prepared on the following culture medium:

| Constituent— | Amount (g./l.) |
|---|---|
| NaNO$_3$ | 3 |
| K$_2$HPO$_4$ | 1 |
| MgSO$_4$.7H$_2$O | 0.5 |
| KCl | 0.5 |
| FeSO$_4$.7H$_2$O | 0.01 |
| Lactose | 50 |
| Agar | 20 |

The cultures are prepared by growth on slants of the culture medium at 28° C. for a period of about 3 weeks and stored under refrigeration until use. An inoculum of the culture then is made by first scraping off the growth on each slant with 3 ml. of sterile water. 1 ml. of the suspension is then added to a flask containing 40 ml. of any one of the following media:

| Constituent | Amount (g./l.) | | | | |
|---|---|---|---|---|---|
| | Medium A | Medium B | Medium C | Medium D | Medium E |
| KH$_2$PO$_4$ | 15.3 | 15.3 | 15.3 | 15.3 | 15.3 |
| K$_2$HPO$_4$ | 21.0 | 21.0 | 21.0 | 21.0 | 21.0 |
| Na$_2$SO$_4$ | 0.75 | 0.75 | 0.75 | 0.75 | 0.75 |
| MgSO$_4$ | 0.18 | 0.18 | 0.18 | 0.18 | 0.18 |
| ZnSO$_4$.7H$_2$O | 0.03 | 0.03 | 0.03 | 0.03 | 0.03 |
| MnSO$_4$.H$_2$O | 0.03 | 0.03 | 0.03 | 0.03 | 0.03 |
| CuSO$_4$.5H$_2$O | 0.0075 | 0.0075 | 0.0075 | 0.0075 | 0.0075 |
| CaCl$_2$ | 0.057 | 0.057 | 0.057 | 0.057 | 0.057 |
| Fe(NH$_4$)$_2$(SO$_4$)$_2$.6H$_2$O | 0.15 | 0.15 | 0.15 | 0.15 | 0.15 |
| (NH$_4$)$_2$SO$_4$ | 7.5 | 7.5 | 7.5 | 7.5 | 7.5 |
| Sucrose | 36.0 | 36.0 | 36.0 | 36.0 | 36.0 |
| Glucose | 27.0 | 27.0 | 27.0 | 27.0 | 27.0 |
| Oleic Acid | 0.9 | 0.9 | 0.9 | 0.9 | 0.9 |
| DL-Methionine | | 5.0 | | 5.0 | 3.0 |
| L-Cysteine.HCl | | | 1.6 | 1.6 | 1.6 |
| pH | 7.3–7.5 | 7.3–7.5 | 7.3–7.5 | 7.3–7.5 | 7.3–7.5 |

The inoculum then is developed for 4 or 5 days at 28° C. on a rotary shaker at 220 r.p.m. The inoculum thus produced is used for making cephalosporin C in one of the above mediums B through E in which is contained a suitable quantity of the stimulatory additives AL and ACA.

The fermentation mediums of the present invention are prepared by first mixing the constituents of the fermentation medium and diluting with water to a liter of solution. Then 10 ml. portions of the medium are removed for each individual run and the desired quantity of AL or ACA is added. The medium then is inoculated with 0.25 ml. of the inoculum and shaken at 28° C. at 220 r.p.m. for 5 days.

Microbiological assays for cephalosporin C are made on the centrifuged broth using an agar-disc technique. Penicillinase is included in the agar to destroy any cephalosporin N which is produced. The assay organism is *Escherichia coli* M.B. 208. Assays are in terms of the production of the sodium salt of cephalosporin C.

The effect of the presence of AL and ACA on the fermentation is dramatically illustrated in the following experimental results presented in the tables below:

Table I

| Medium: | Amt. of Ceph. C (γ/ml.) produced |
|---|---|
| B | 430 |
| B+19 mg. AL | 630 |
| B+13 mg. ACA | 750 |

As is shown in Table I above, the presence of AL or ACA results in an improvement of 50% or more in the amount of cephalosporin C which is produced.

Table II

| Medium: | Amt. of Ceph. C (γ/ml.) produced |
|---|---|
| C | 340 |
| C+19 mg. AL | 570 |
| C+13 mg. ACA | 600 |

The results in Table II illustrate the improvement in yields of cephalosporin C in a fermentation medium which does not contain any methionine.

Table III

| Medium: | Amt. of Ceph. C (γ/ml.) produced |
|---|---|
| D | 260 |
| D+20 mg. AL | 300 |
| D+20 mg. ACA | 320 |
| D+20 mg. AL+20 mg. ACA | 380 |

These results illustrate the improvement in Medium D.

Table IV

| Medium: | Amt. of Ceph. C (γ/ml.) produced |
|---|---|
| E | 470 |
| E+20 mg. AL and 20 mg. ACA | 890 |
| E+20 mg. AL and 20 mg. ACA added after 48 hrs | 760 |

In Table IV there is shown the enhanced effect of a combination of AL and ACA. The third entry in the table illustrates that the effect is pronounced even when the AL and ACA constituents are added after the fermentation has proceeded for a period of time.

Table V

| Medium: | Amt. of Ceph. C (γ/ml.) produced |
|---|---|
| E | 530 |
| E+26 mg. ACA | 710 |
| E+38 mg. AL | 650 |
| E+26 mg. ACA+38 mg. AL | 890 |

The results in Table V illustrate the effect of addition of AL and ACA alone and together in Medium E.

What has been described herein is a method for improving the yield of cephalosporin C by fermentation. While the invention has been described with reference to certain embodiments thereof, certain modifications and additions may be made which are within the skill of the art.

What is claimed is:

1. In a method for improving the yield of cephalosporin C by fermentation with a cephalosporin C producing microorganism the step which comprises adding to the fermentation medium a compound selected from the group consisting of ε-N-acetyl-L-lysine and ε-amino-n-caproic acid.

2. In a method for improving the yield of cephalosporin C by fermentation with a cephalosporin C producing microorganism the step which comprises adding ε-N-acetyl-L-lysine to the fermentation medium.

3. In a method for improving the yield of cephalosporin C by fermentation with a cephalosporin C producing microorganism the step which comprises adding ε-amino-n-caproic acid to the fermentation medium.

4. In a method for improving the yield of cephalosporin C by fermentation with a cephalosporin C producing microorganism the step which comprises adding to a methionine-containing fermentation medium a compound selected from the group consisting of ε-N-acetyl-L-lysine and ε-amino-n-caproic acid.

5. In a method for improving the yield of cephalosporin C by fermentation with a cephalosporin C producing microorganism the step which comprises adding to the fermentation bath a mixture of the compounds ε-N-acetyl-L-lysine and ε-amino-n-caproic acid.

6. In a method for improving the yield of cephalosporin C by fermentation with a cephalosporin C producing microorganism the step which comprises adding to the fermentation medium a mixture of about 20 mg. each of the compounds ε-N-acetyl-L-lysine and ε-amino-n-caproic acid.

References Cited in the file of this patent

UNITED STATES PATENTS

| 2,831,797 | Miller et al. | Apr. 22, 1958 |
| 2,883,328 | Florey et al. | Apr. 21, 1959 |